Oct. 6, 1925.

S. E. MORRAL ET AL

CORN HUSKING MACHINE

Filed April 11, 1923  4 Sheets-Sheet 4

Inventors,
SAMUEL E. MORRAL.
WILLIAM W. MORRAL.

Attorney

Patented Oct. 6, 1925.

1,556,016

UNITED STATES PATENT OFFICE.

SAMUEL E. MORRAL AND WILLIAM W. MORRAL, OF MORRAL, OHIO.

CORN-HUSKING MACHINE.

Application filed April 11, 1923. Serial No. 631,385.

*To all whom it may concern:*

Be it known that we, SAMUEL E. MORRAL and WILLIAM W. MORRAL, citizens of the United States, residing at Morral, in the county of Marion and State of Ohio, have invented certain new and useful Improvements in Corn-Husking Machines, of which the following is a specification, reference being had therein to the accompanying drawing.

This invention relates to corn husking machines and more particularly to a portable husking machine which can be transported from one shock of corn to another as the corn is husked.

One object of the invention is to provide a machine of this type which will separate the ears of corn from the stalks without breaking the latter or shelling the corn, husk the corn, and bind the stalks into bundles.

A further object of the invention is to provide such a machine in which the husks removed from the ears of corn will be gathered into and bound with the bundles of stalks.

A further object of the invention is to provide an improved ear removing roll.

A further object of the invention is to provide an improved husking roll.

A further object of the invention is to provide means for saving the corn which may be shelled from the ears by the ear removing devices.

Other objects of the invention will appear as the mechanism is described in detail.

In the accompanying drawings.

In these drawings we have illustrated one embodiment of our invention and have shown the same as applied to a portable corn husking machine of a known type but it will be understood that the invention may be embodied in machines of various kinds and may take various forms without departing from the spirit thereof.

Figures 1, 12:
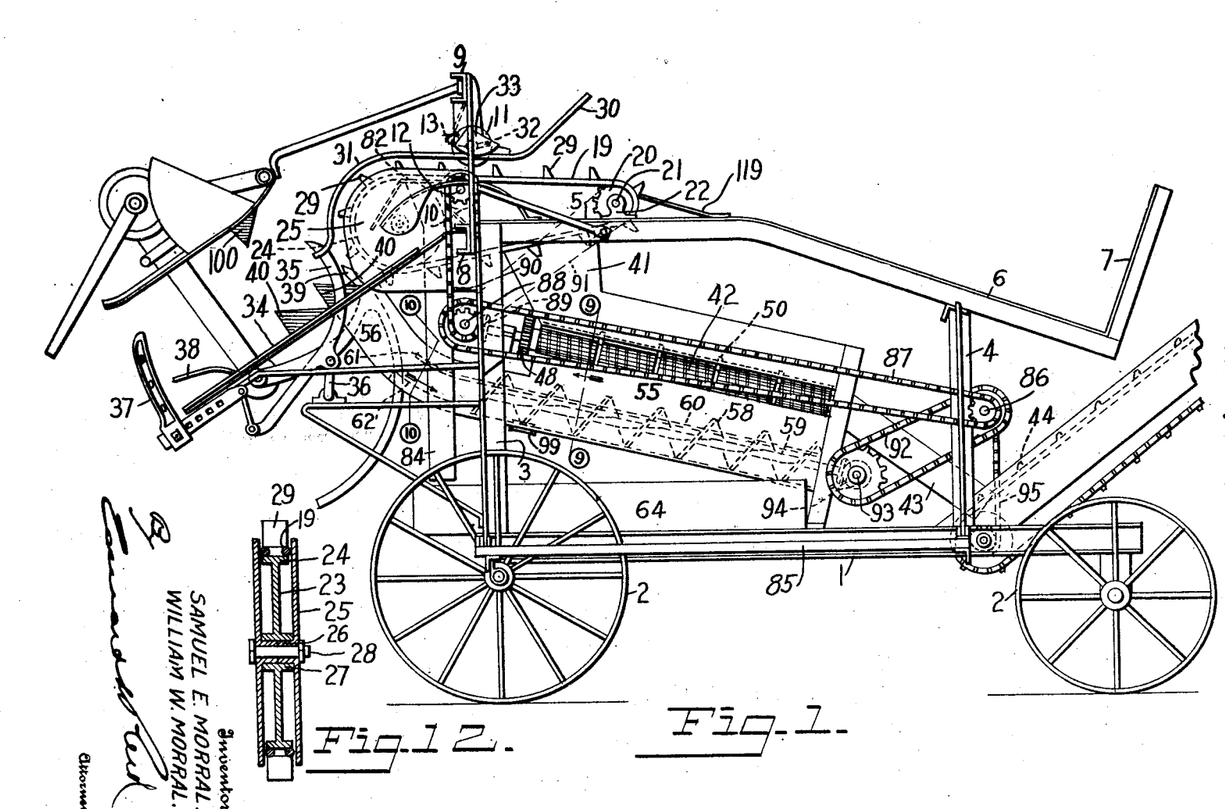
Fig. 1 is a side elevation, partly broken away, of a machine embodying my invention.
Fig. 12 is a sectional detail view of one of the supporting drums for the stalk conveyor.
Figure 2:
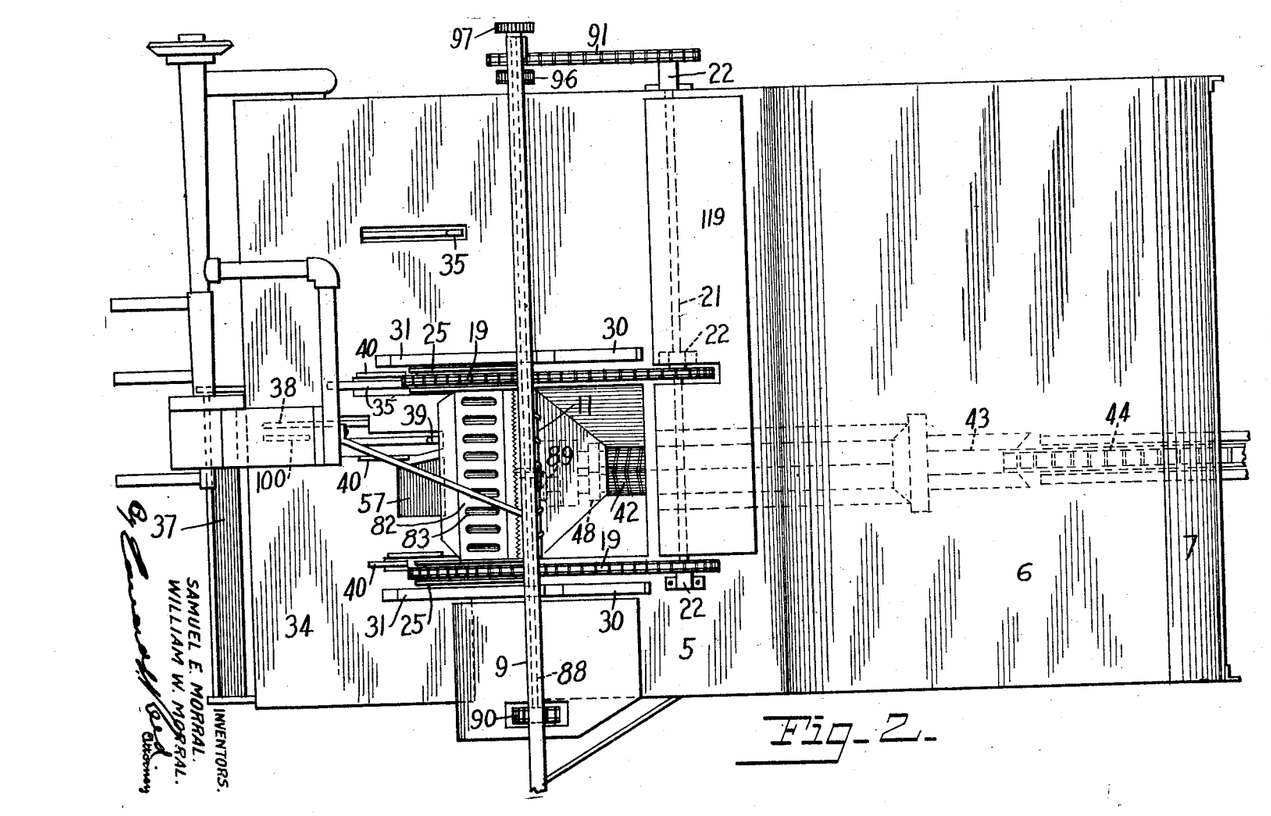
Fig. 2 is a plan view of the same.
Figures 3, 4, 5, 6, 7:
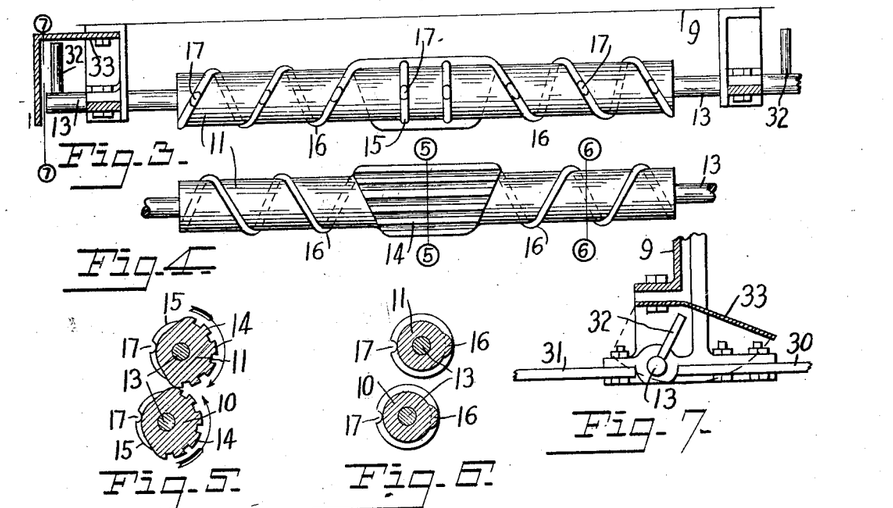
Fig. 3 is an elevation of one of the snapping rolls.
Fig. 4 is an elevation of that side of the snapping roll opposite that shown in Fig. 3, with the roll turned end for end.
Fig. 5 is a section taken on the line 5—5 of Fig. 4.
Fig. 6 is a section taken on the line 6—6 of Fig. 4.
Fig. 7 is a section taken on line 7—7 of Fig. 3.

The particular machine here shown comprises a main frame consisting of a base portion 1 and standards 3 and 4. The main frame which is preferably mounted on wheels 2 and constitutes a truck which may be transported from place to place in any suitable manner, as by coupling the same to a wagon or the like. Mounted on the upper ends of the standards 3 and 4 is a table 5 having its forward portion sloping downwardly, as shown at 6, and provided at its lower end with an upright portion 7. The parts 6 and 7 of the table constitute in effect a trough on which the stalks of corn may be placed as they are taken from the shock. The stalks of corn which are placed in the trough are moved, either by hand, by conveyor or by both, to an ear removing device which is arranged at the rear end of the table 5 and which serves to remove the ear from the stalk and discharge the stalk on one side of the ear removing device and the ear on the other side thereof. This ear removing device may be of any suitable character but we prefer to employ what are known as snapping rolls. As here shown, a transverse frame is mounted on the rear end of the main frame and consists of parallel bars 8 and 9 rigidly secured to the main frame and spaced apart and of such a length that a stalk of corn may pass between the same in a position parallel therewith without contacting with the connecting members. Mounted between the bars 8 and 9 on axes parallel therewith are two snapping rolls 10 and 11 which are carried by shafts 12 and 13 journaled in suitable bearings on the bars of the transverse frame members 8 and 9. These snapping rolls are of such a character that they will pass the stalk of corn between them without breaking it but will sever the ear of corn from the stalk. To this end they are preferably provided with cooperating portions which will engage the stem of the ear to sever it and thus remove the ear from the stalk and on one or both sides of said ear removing portions are provided with means for moving the stalk of corn lengthwise and parallel with the axes of the rolls to bring the ear into operative relation to the ear removing portions of the rolls. The rolls may take various forms but we prefer the form shown in Figs. 3 and 4 where we have illustrated the upper snapping roll 11, which comprises an elongated cylindrical body portion mounted on the shaft 13 and having at a point spaced from both ends thereof a series of parallel longitudinally extending ribs 14. This series of ribs extends approximately half way about the circumference of the body of the roll and the ribs gradually decrease in length, as shown in Fig. 4. On the side of the roll opposite the longitudinally ribbed portion 14 of the body portion is provided with transverse ribs 15 and at each end of the ribbed portion and extending therefrom to the respective ends of the roll are spiral ribs 16, which are turned in opposite directions so that an ear of corn engaged by the spiral ribs, on either side of the ear removing portion of the roll, will be moved toward said ear removing portion. Both the ribs 15 and 16 have formed therein notches or recesses 17 adapted to receive a stalk of corn and permit the same to pass between the rolls. It will be understood that the two rolls are substantially identical and that the ribbed ear removing portions thereof are so arranged that when the rolls are removed in opposite directions, as shown in Fig. 5, these ribbed portions will be brought into cooperative relation. When a stalk of corn is presented to the snapping rolls in a position parallel therewith it is moved into engagement with the two rolls and as the rolls rotate the stalk will enter the recesses 17 in the ribs and will be carried between the two rolls but the ear will be brought into engagement with the rolls and held against further movement. If the ear is not adjacent to the central ribbed portions of the rolls it will be engaged by the ribs 16 and moved toward the center of the rolls. Inasmuch as the stalk lies on one side of the rolls and the ear on the other this longitudinal movement of the stalk and ear will bring the stem of the ear between the ear removing portions of the rolls and the ear will be pinched off.

The stalks of corn may be presented to the snapping rolls, in positions parallel therewith, in any suitable manner but, in the present machine, we have mounted on the upper rear portion of the main frame a conveyor which extends over the table 5 and is adapted to receive the stalks of corn and move them toward and between the snapping rolls. This conveyor preferably comprises two sprocket chains 19 supported at their forward ends on sprocket wheels 20 carried by a shaft 21 journaled in bearings 22 mounted on the table 5. The rear ends of the conveyor chains may be mounted on sprocket wheels if desired, but we have found that sprocket wheels have a tendency to gather fragments of the leaves and stalks which accumulate to such an extent as to interfere with the operation thereof and we therefore prefer to employ a supporting wheel or drum 23 having a plain cylindrical surface, as shown at 24, about which the chain 19 extends. This supporting drum is mounted between guide plates 25 the edges of which extend slightly beyond the periphery of the drum and prevent the lateral displacement of the chain thereon. In the present instance, the plates 25 are rigidly secured to the main frame and form the support for the drums 23. To this end each plate 25 is provided with an inwardly extending projection or trunnion 26 on which the hub 27 of the drum 23 is mounted and about which it rotates freely. The two plates are connected one to the other to prevent them from spreading by means of a bolt 28 extending through the trunnions 26. The conveyor chains are arranged at the respective ends of the snapping rolls, as shown in Fig. 2, and are preferably provided with projections or teeth 29 which engage the stalks and carry the same past the snapping rolls. A guard 30 at the forward side of the snapping rolls tends to force the stalks downwardly into engagement with the conveyor so that they will be carried between the snapping rolls. In the rear of the snapping rolls downwardly curved guards 31 extend about the drums 23 to hold the stalks in engagement with the conveyor until they have reached the proper point of discharge, these guards being spaced at such a distance from the drum that the teeth 29 will not engage the same. If desired, means may be provided to engage the end portions of the stalk of corn at points more or less remote from the snapping rolls and move the same forwardly along with the part that is acted upon by the conveyor chains 19. In the present device, we have provided the shaft 13 for the upper snapping roll with radially extending pins 32 which will engage the end portions of the stalks of corn and force the same forwardly. These pins may, is desired, be arranged beneath housing or guards 33. The conveyor chains 19 may be mounted in any suitable relation to the platform 5. In the present instance, the upper stretches or operative portions of the conveyor chains are spaced some distance above the platform 5 and an inclined plate 119 leads upwardly from the platform to the chains and also extends across the shaft 21 to prevent the stalks or leaves from wrapping about this shaft.

The character and arrangement of the snapping rolls is such that the stalks of corn will pass between the same and be delivered in an unbroken condition, and in the present machine we have provided means for gathering these stalks into bundles and binding the same. To this end we have mounted on the rear end of the main frame a binding table 34 which slopes downwardly and rearwardly and is so arranged that the stalks discharged by the conveyor chains 19 will fall upon the same. Associated with this table is suitable mechanism for bunching and binding the stalks, but inasmuch as this binding mechanism is of a well known character and in itself forms no part of the invention it is not necessary to illustrate or describe it in detail. Suffice it to say that a series of gathering arms 35 are mounted beneath the binding table and extend through slots therein at points adjacent to the point at which the stalks are delivered to the table. These gathering arms are actuated by a crank shaft 36 which projects the same upwardly and rearwardly so that the stalks on the table will be moved rearwardly along the table and into engagement with a suitable stop or gate 37 which is movably mounted at the lower rear end of the binding table. When the stalks have accumulated on the table in the desired quantity the weight and pressure thereof will actuate a trip lever 38 which operates a clutch mechanism, not shown, and causes the needle 39 to carry the twine into an operative position with relation to the knotting mechanism, where the knot is formed and the twine severed, after which the gate 37 is dropped to permit the bundle to be discharged. As has been stated, this binding mechanism is old in its general features of construction and operation but we have provided in combination with the binding table, mounted and arranged as shown, a series of upwardly projecting stops or plates 40, the rear edges of which are substantially at right angles to the surface of the binding table and the forward edges of which are inclined so that the stalks of corn will be carried over these triangular plates by the gathering arms 35 and the triangular plates will then prevent the stalks from springing back or following the gathering arms in their return movement, thereby facilitating the forming of the bundle. If desired, a similar stop may be attached to the lower side of the knotter, as shown at 100.

Figure 8:
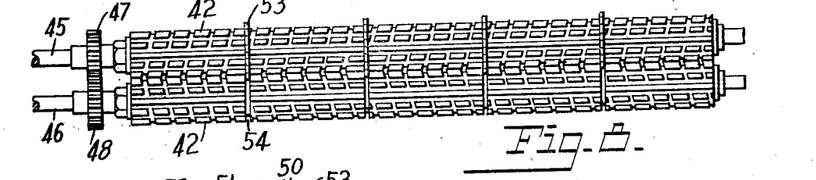
Fig. 8 is a plan view of the husking rolls.
Figure 11:
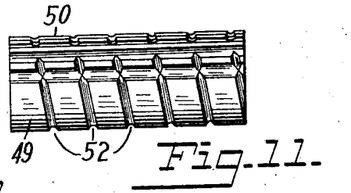
Fig. 11 is a detail view of a section of one of the husking rollers.

The ears which are removed from the stalks by the snapping rolls drop away from the rolls through an opening in the table 5 to a chute 41 which leads to the husking rolls 42. These husking rolls may be of any suitable character and arrangement but, as here shown, they extend lengthwise of the machine and slope toward the rear thereof so that the ears from which the husks are removed will move by gravity along the rolls and will be discharged through a chute 43 to an elevator or conveyor 44 which conveys the husked ears to a suitable point of discharge, such as the bed of the wagon with which the machine is connected. Various types of husking rolls may be employed but, in the present machine, we have shown the construction of a husking roll which is highly efficient. The husking devices as a whole comprise two rolls 42 which are mounted on shafts 45 and 46 and are connected one to the other by gears 47 and 48, so that they will be rotated in opposite directions. Each roll is formed in a series of sections, as shown at 49, in Fig. 11, and these sections are assembled on the shafts 45 and 46. The peripheral surface of each section is divided into four approximately equal portions each extending lengthwise of the section. Two of these portions, arranged on diametrically opposite sides of the roll, are provided with longitudinally extending ribs 50 while the other portions are substantially smooth, as shown at 51. Both the ribbed portions and the smooth portions are provided with a spiral groove 52 which extends from one end of the roll to the other but is interrupted on each side of the roll by one of the longitudinal ribs 50, which has an unbroken surface throughout its length. The several sections of one roll, when mounted on the shaft, are separated by toothed wheels 53, the teeth of which project beyond the periphery of the roll and serve to loosen the husks on the ears of corn so that these can be more readily grasped by the rolls. It will be understood, however, that only one of the rolls is provided with the toothed wheels, the other roll being provided in lieu thereof with a groove or circumferential space 54 to receive the teeth of the wheel 53. Preferably the roll carrying the toothed wheels 53 is arranged with its axis in a slightly higher plane than the axis of the other roll, so that the ears will be more firmly supported for engagement by the teeth of the wheel 53.

Figure 9:
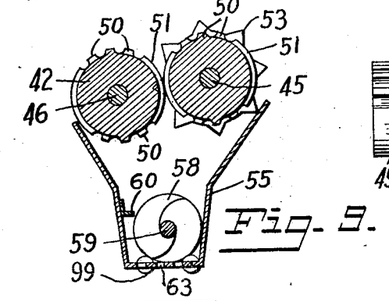
Fig. 9 is a section taken on line 9—9 of Fig. 1.
Figure 10:
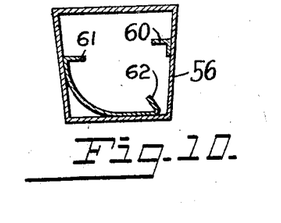
Fig. 10 is a section taken on the line 10—10 of Fig. 1.
Figure 14:
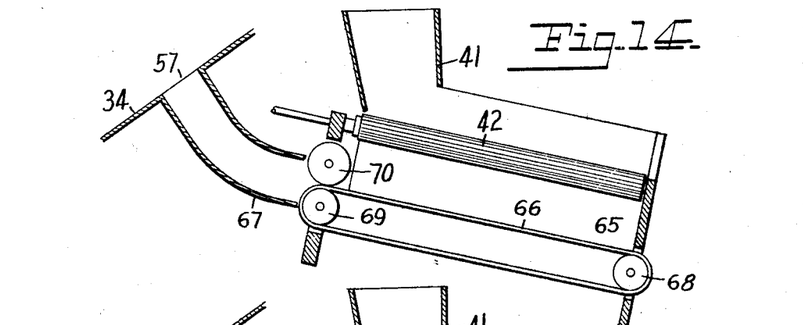
Fig. 14 is a sectional view of a modified form of husk conveyor.

The husks which are removed from the ears pass between the husking rolls and are delivered into a hopper or conveyor trough 55 which extends for the full length of the husking rolls and has its rear end turned upwardly, as shown at 56, and communicating with an opening 57 in the binding table 34. Mounted in this trough is a conveyor which will cause the husks to be forced rearwardly along the trough and through the opening 57 onto the binding table where they will be gathered into the bundle along with the stalks and bound. Any suitable form of conveyor may be used for conveying the husks through the trough to the binding table. In that form of the device shown in Figs. 9 and 10, we have employed a spiral conveyor 58 which is carried by a shaft 59 and is rotatably mounted in an angular trough, the rear end portion of the spiral being preferably mounted in rollers 99. To prevent the husks rotating with the conveyor, which would interfere with their rearward movement, one of the side walls of the trough may be provided with an inwardly extending flange 60 and, in the present instance, we have provided the portion 56 of the conveyor trough which lies beyond the end of the spiral conveyor with two additional inwardly extending flanges, as shown at 61 and 62, which will prevent the mass of husks from rotating in the trough or chute and facilitate their forward movement. Preferably the bottom of the conveyor trough is perforated, as shown at 63, to permit the passage of any corn which may be shelled from the ears, and a suitable receptacle 64 is arranged beneath the trough to receive this shelled corn. As has been stated, the husks conveyor may be of any suitable form and, in Fig. 14, we have shown a conveyor trough 65 as having mounted therein an endless belt 66 which receives the husks from the husking rolls and carries them rearwardly where they are discharged into a chute 67 leading to the binding table 34. This belt is mounted on drums or rollers 68 and 69, mounted at the respective ends of the trough 65 and a third roller 70 is arranged above the roller 69 so that the two rollers will act upon the husks to positively force the same through the chute 67.

Figures 13, 15, 16:
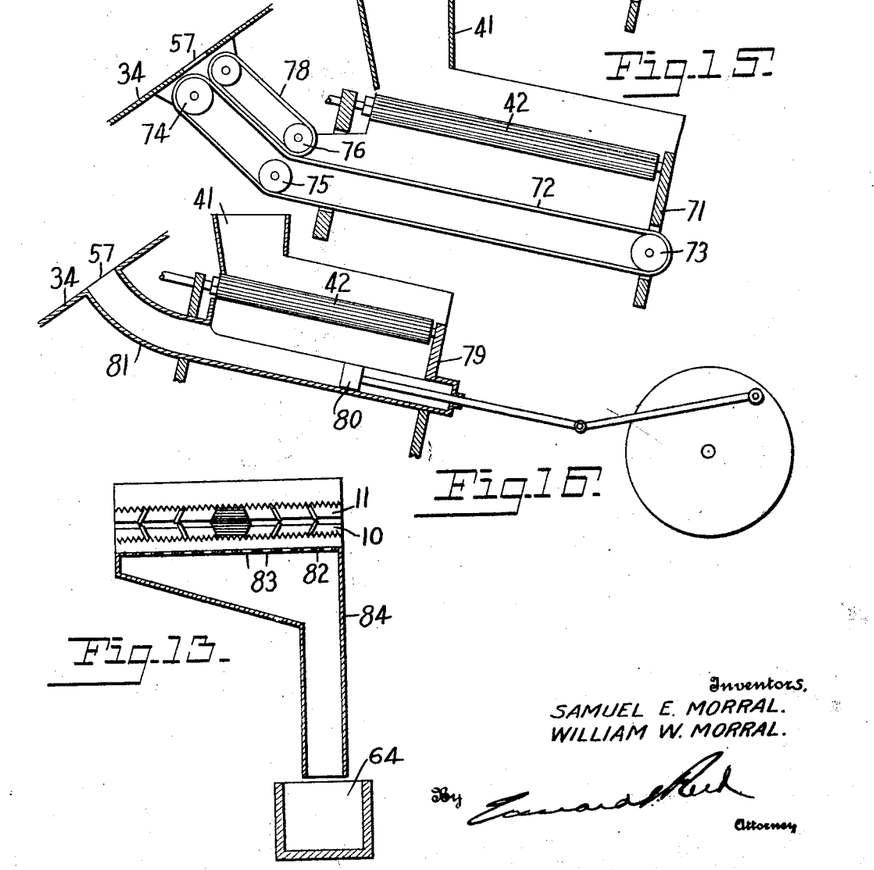
Fig. 13 is a sectional detail view of the shelled corn saving device.
Fig. 15 is a sectional view of another form of husk conveyor.
Fig. 16 is a sectional view of still another form of husk conveyor.

In Fig. 15 the conveyor trough is shown at 71 and is provided with an endless belt conveyor 72 which extends about a roller 73 at the forward end of the trough and about a second roller 74 mounted just beneath the binding table 34. The lower stretch of the belt extends about a guide roller 75 and the upper stretch of the belt is guided by the lower roller 76 of a supplemental conveyor belt 78, thus imparting a bend to the conveyor 72 and causing the husks to be carried upwardly between the two conveyor belts 72 and 78 and discharged onto the binding table.

In Fig. 16 the conveyor trough 79 has mounted therein a reciprocatory plunger 80 which forces the husks rearwardly through the curved end portion or chute 81 of the trough and onto the binding table. It will be understood that these several modified forms of the conveyor are illustrated merely to show the widely different types of conveyor which may be used and that any suitable type of conveyor may be employed.

We have also mounted in the rear of the snapping rolls and beneath the path of the stalks of corn passing though the same, a plate 82 having perforations 83 leading to a chute 84 which discharges into the shelled corn receptacle 64, thus collecting and saving any corn which may be shelled from the ears by the snapping rolls. The several parts of the mechanism may be driven from any suitable source of power and through any suitable driving connections. As here shown, a main driving shaft 86 is mounted on the front standards 4 of the main frame and this shaft may be driven, if desired, from a gas engine mounted upon the main frame. A sprocket chain 87 connects the shaft 86 with a transverse shaft 88 mounted on the rear uprights 3 of the main frame and this shaft 88 is connected by bevel gearing 89 with the shaft of one of the husking rollers 42, which roller transmits the movement to the second roller through the gears 47 and 48. A sprocket chain 90 connects the transverse shaft 88 with the shaft 12 of the lower snapping roll, and the upper snapping roll is driven from the shaft 88 through a sprocket chain 96 connected with a counter shaft, not shown, which in turn is connected with the shaft 13 of the upper snapping roll by suitable gearing 97. A sprocket chain 91 connects the shaft 88 with the shaft 21 for the stalk conveyors 19. The binding mechanism may be driven from the shaft 88 in any suitable manner but we have not shown these driving connections. A sprocket chain 92 connects the main shaft 86 with a transverse shaft 93 which is connected by bevel gearing 94 with the shaft 59 of the conveyor 58, while a sprocket chain 95 connects the main shaft 86 with the elevating conveyor 44.

The operation of the mechanism will be readily understood from the foregoing description of the several parts thereof but it will be apparent that when the machine is in operation the stalks of corn are placed in a pile in the trough 6—7 and are moved by an operator, standing on the platform 85, into engagement with the conveyors 19 and are then carried by these conveyors between the snapping rolls which remove the ears therefrom and deliver these ears to the husking rolls while the stalks themselves are discharged onto the binding table and there bound into bundles. The husks are removed from the ears by the husking rolls and the husked ear delivered to the ear conveyor 44, while the husks are taken by the husk conveyor and delivered onto the binding table. The construction as a whole is very simple and is highly efficient in its operation, and it will be apparent that we have provided a mechanism which is readily transported from one shock of corn to another and which will husk the corn and deliver it to the wagon bed and tie the stalks in bundles so that they can be quickly and easily replaced in shocks.

While we have shown and described one embodiment of our invention we wish it to be understood that we do not desire to be limited to the details thereof as various modifications may occur to a person skilled in the art.

Having now fully described our invention what we claim as new and desire to secure by Letters Patent, is:

1. In a machine of the character described, ear removing devices, means for moving a stalk of corn between said ear removing devices, husking devices to receive the ears from said ear removing devices, a binding table to receive the stalks from said ear removing devices, said table having an opening therein, a conveyor arranged to receive the husks from said husking devices and to discharge the same through the opening in said binding table onto the upper surface thereof, and means to gather said stalks and husks into a bundle and bind the same.

2. In a machine of the character described, ear removing devices, means for moving stalks of corn between said ear removing devices, a binding table to receive said stalks from said ear removing devices, arms acting on said stalks to gather same into bundles, stops carried by said table to retain the stalks in the positions to which they have been moved, and means for binding said bundle.

3. In a machine of the character described, ear removing devices, means for moving stalks of corn between said ear removing devices, a binding table mounted beyond said ear removing devices, sloping downwardly therefrom and provided with openings, arms operating through said openings in said table to gather the stalks on said table into a bundle, stop plates mounted edgewise on said binding table and having their upper edges inclined to permit the stalks to be moved over the same by said arms, and means for binding said bundle of stalks.

4. In a machine of the character described, a pair of snapping rollers each comprising a body portion having on one side thereof a series of longitudinally extending ribs and having on that side opposite said ribs a transversely extending rib and also having a spiral rib extending from the end of said body portion to a point adjacent to said longitudinally extending ribs, said spiral rib and said transverse rib having notches therein, the several notches being arranged in a line extending longitudinally of said body portion, and means for presenting a stalk of corn to said snapping rolls in a position parallel therewith.

5. In a machine of the character described, a pair of snapping rolls each comprising a body portion having on one side thereof a series of longitudinally extending ribs and having on that side thereof opposite said longitudinal ribs a pair of transverse ribs, and spiral ribs extending in opposite directions about said body portion and leading from the respective ends of said body portion to said longitudinally extending ribs, and means for presenting a stalk of corn to said snapping rolls in a position parallel therewith.

6. In a machine of the character described, a pair of snapping rolls, a conveyor to move the stalks of corn transversely to their length between said snapping rolls, said conveyor comprising a sprocket chain, a sprocket wheel supporting the forward end of said chain and driving the same, a drum supporting the discharge end of said chain, and guard plates arranged at the opposite sides of said drum to hold the chain against lateral displacement thereon.

7. In a machine of the character described, a frame, snapping rolls carried by said frame, parallel plates rigidly secured to said frame and extending rearwardly from said snapping rolls, a drum rotatably mounted between said plates and supported thereby, said drum being of such diameter that the edges of said plates will extend beyond the periphery of the drum, a sprocket wheel supported by said frame on the opposite side of said snapping rolls, means for driving said sprocket wheel, and a sprocket chain extending about said sprocket wheel and said drum and having one stretch thereof arranged to move a stalk of corn between said snapping rolls.

8. In a machine of the character described, a frame, a pair of snapping rolls mounted on said frame, a pair of parallel plates rigidly secured at their forward edges to said frame at a point adjacent to said snapping rolls and extending rearwardly therefrom, said plates having inwardly extending projections, a drum arranged between said plate and rotatably mounted on said inwardly extending projections, a bolt extending through said plates and said projections to hold said plates against lateral displacement, said drum being of such diameter that the edges of said plates will project beyond the periphery of said drum, a sprocket wheel supported by said frame on the opposite side of said snapping rolls, and a sprocket chain extending about said sprocket wheel and said drum and having one stretch thereof arranged to move a stalk of corn between said snapping rolls.

9. In a machine of the character described, ear removing devices, means for moving stalks of corn between said ear removing devices, husking devices to receive the ears of corn from said ear removing devices, a binding table to receive the stalks of corn from said husking devices, a conveyor trough arranged beneath said husking devices to receive the husks therefrom, a chute leading from said conveyor trough to said table, said table having an opening communicating with said chute, and a screw conveyor mounted in said conveyor trough to move the husks through said chute onto said binding table.

10. In a machine of the character described, ear removing devices, means for moving stalks of corn between said ear removing devices, husking devices to receive the ears of corn from said ear removing devices, a binding table to receive the stalks of corn from said husking devices, a conveyor trough arranged beneath said husking devices to receive the husks therefrom, a chute leading from said conveyor trough to said table, said table having an opening communicating with said chute, and a screw conveyor mounted in said conveyor trough to move the husks through said chute onto said binding table, said conveyor trough having a longitudinal inwardly extending flange along one side thereof to prevent the husks from rotating in said trough with said screw conveyor.

11. In a machine of the character described, ear removing devices, means for moving stalks of corn between said ear removing devices, husking devices to receive the ears of corn from said ear removing devices, a binding table to receive the stalks of corn from said husking devices, a conveyor trough arranged beneath said husking devices to receive the husks therefrom, a chute leading from said conveyor trough to said table, said table having an opening communicating with said chute, a screw conveyor mounted in said conveyor trough to move the husks through said chute onto said binding table, said conveyor trough having a longitudinal inwardly extending flange along one side thereof to prevent the husks from rotating in said trough with said screw conveyor, and said chute having a plurality of longitudinally extending flanges spaced apart about the same.

12. In a machine of the character described, a pair of snapping rolls, means for moving stalks of corn between said snapping rolls, husking rolls to receive the ears from said snapping rolls, a conveyor trough arranged beneath said husking rolls to receive the husks therefrom, a conveyor to move said husks lengthwise of said conveyor trough, said conveyor trough having its bottom wall perforated to permit the passage of shelled corn therethrough, and a shelled corn receptacle arranged beneath said conveyor trough.

13. In a machine of the character described, a pair of snapping rolls, means for moving stalks of corn between said rolls, husking devices to receive the ears from said snapping rolls, an apertured plate arranged beyond said snapping rolls in the path of said stalks, and a chute communicating with the apertures in said plate to receive the grains of corn which may have been shelled from the ears by said snapping rolls.

14. In a machine of the character described, ear removing devices, means for moving stalks of corn between said ear removing devices, and husking rolls to receive the ears of corn from said ear removing devices, each of said rolls comprising a shaft and a series of sections mounted on said shaft, toothed wheels mounted on said shaft between the sections of one of said rolls, and circumferential recesses formed between the sections of the other of said rolls to receive the teeth of the respective toothed wheels.

15. In a machine of the character described, ear removing devices, means for moving stalks of corn between said ear removing devices, and husking rolls to receive the ears of corn from said ear removing devices, each of said rolls comprising a shaft and a series of sections mounted on said shaft, toothed wheels mounted on said shaft between the sections of one of said rolls, and circumferential recesses formed between the sections of the other of said rolls to receive the teeth of the respective toothed wheels, the axis of that roll having the toothed wheels being arranged in a higher plane than the axis of the other roll.

16. In a machine of the character described, ear removing devices, means for moving stalks of corn between said ear removing devices, and a pair of husking rolls to receive the ears from said ear removing devices each of said husking rolls having its circumferential surface divided longitudinally into four parts, two of said parts being provided with longitudinally extending ribs and two of said parts being without ribs, and a spiral groove extending substantially about said roll but terminating at one of said longitudinal ribs on each side of said roll.

17. In a machine of the character described, ear removing devices, husking rolls arranged to receive the ears of corn from said ear removing devices, binding mechanism to receive the stalks after the ears have been removed therefrom, and means arranged beneath said husking rolls and said binding mechanism to receive the husks from said husking rolls and deliver the same to said binding mechanism.

18. In a machine of the character described, ear removing devices, husking rolls arranged to receive the ears of corn from said ear removing devices, binding mechanism to receive the stalks after the ears have been removed therefrom, and comprising a binder table, a trough arranged to receive the husks from said husking rolls, a chute leading from said trough to said binder table, and means to move the husks from said trough through said chute to the binder table.

19. In a machine of the character described, ear removing devices, husking rolls arranged to receive the ears of corn from said ear removing devices, binding mechanism to receive the stalks after the ears have been removed therefrom, and comprising a binder table having an opening therethrough, a trough arranged to receive the husks from said husking rolls, a chute connecting said trough with the opening in said binder table, and means operating in said trough to force the husks through said chute to the binder table.

20. In a machine of the character described, a pair of snapping rolls, means for moving stalks of corn between said snapping rolls, a binder attachment on the discharge side of said snapping rolls and comprising a table to receive the stalks from said snapping rolls, said table having an opening therein, a trough arranged beneath said husking rolls to receive the husks therefrom, a chute connecting said trough with the opening in said binder table, and a conveyor to deliver the husks from said trough through said chute and said opening onto said binder table.

21. In a machine of the character described, a pair of snapping rolls, means for moving stalks of corn between said snapping rolls, a feeding table located on the feeding side of said snapping rolls and having an opening therein, a binder attachment located on the discharge side of said snapping rolls and comprising a table having an opening therein, husking rolls arranged below said feeding table to receive the ears from said snapping rolls, a trough located under said husking rolls to receive the husks therefrom, a chute extending from said trough to the opening in said binder table, and means to deliver the husks from said trough through said chute and said opening onto said binder table.

22. In a machine of the character described, a pair of snapping rolls, the upper roll having a shaft extending beyond the end thereof, conveyors arranged to engage the intermediate portion of a stalk of corn and move the same transversely between said snapping rolls, and a pin carried by said shaft at a point remote from the end of said snapping roll to engage the end portion of said stalk of corn and advance the same.

23. In a machine of the character described, a pair of snapping rolls, the upper roll having a shaft extending beyond the end thereof, conveyors arranged to engage the intermediate portion of a stalk of corn and move the same transversely between said snapping rolls, a pin carried by said shaft at a point remote from the end of said snapping roll to engage the end portion of said stalk of corn and advance the same, husking devices to receive the ears of corn from said snapping rolls, binder mechanism to receive the stalks of corn from said snapping rolls, and means for delivering the husks from said husking rolls to said binding mechanism.

24. In a machine of the character described, ear removing devices, a binder attachment arranged to receive the stalks from said ear removing devices, husking rolls arranged to receive the ears from said ear removing devices, a trough to receive the husks from said husking rolls, a spiral conveyor mounted in said trough, a roller bearing to support said spiral conveyor, and a chute leading from said trough to said binder attachment.

25. In a machine of the character described, ear removing devices, and husking rolls to receive the ears of corn from said ear removing devices, each of said husking rolls comprising a plurality of sections, each section having longitudinally corrugated portions spaced apart circumferentially thereof and smooth portions arranged between said corrugated portions.

26. In a machine of the character described, ear removing devices, husking rolls to receive the ears of corn from said ear removing devices, each of said husking rolls comprising a plurality of sections, each section having longitudinally corrugated portions spaced apart circumferentially thereof and smooth portions arranged between said corrugated portions, toothed disks arranged between the ends of the adjacent sections of one of said rolls, and the other roll having circumferential channels arranged between the adjacent ends of the sections thereof to receive the teeth of the respective disks.

27. In a machine of the character described, ear removing devices, husking rolls to receive the ears of corn from said ear removing devices, each of said husking rolls comprising a plurality of sections, each section having longitudinally corrugated portions spaced apart circumferentially thereof and smooth portions arranged between said corrugated portions, each section also having a spiral groove extending across the smooth portions thereof and across parts of the corrugated portions thereof, each of said corrugated portions having a rib which intersects said spiral groove.

28. In a machine of the character described, ear removing devices, husking rolls to receive the ears of corn from said ear removing devices, each of said husking rolls comprising a plurality of sections, each section having longitudinally corrugated portions spaced apart circumferentially thereof and smooth portions arranged between said corrugated portions, each section also having a spiral groove extending across the smooth portions thereof and across parts of the corrugated portions thereof, each of said corrugated portions having a rib which intersects said spiral groove, disks arranged between adjacent ends of the section of one of said rolls and having teeth extending beyond the peripheries of said sections, the other of said rolls having circumferential grooves arranged between the adjacent ends of said sections to receive said teeth.

In testimony whereof we affix our signatures hereto.

SAMUEL E. MORRAL.
WILLIAM W. MORRAL.